Feb. 17, 1931. L. WELKER 1,793,032
ENSILAGE DISTRIBUTOR
Filed Nov. 23, 1929 2 Sheets-Sheet 1
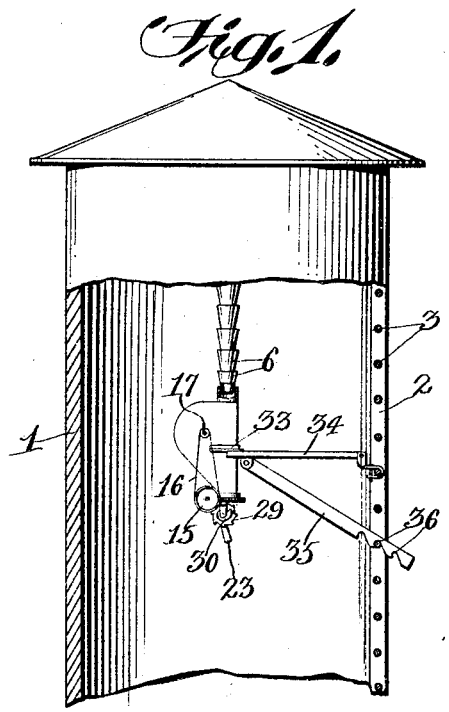
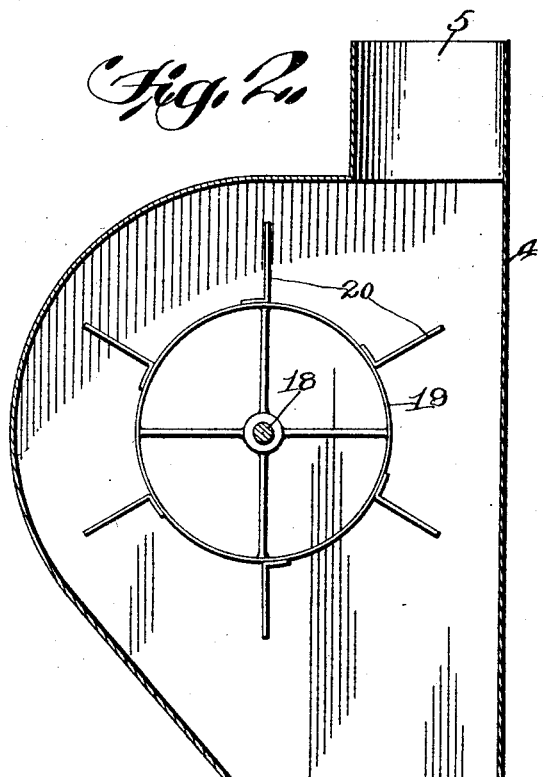
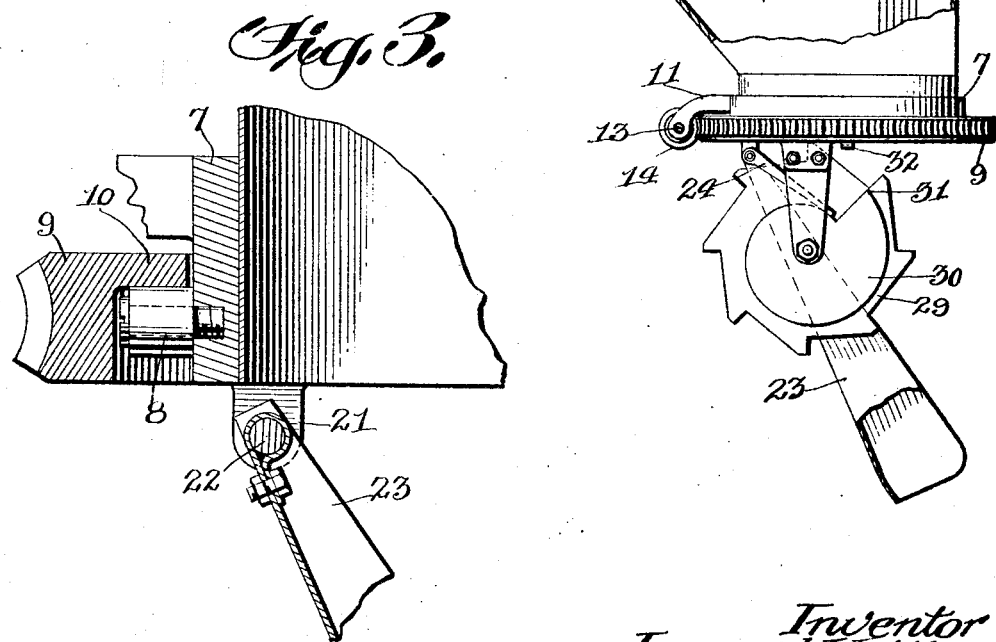
Inventor
Leonard Welker
By
Attorneys Feb. 17, 1931.  L. WELKER  1,793,032
ENSILAGE DISTRIBUTOR
Filed Nov. 23, 1929  2 Sheets-Sheet 2
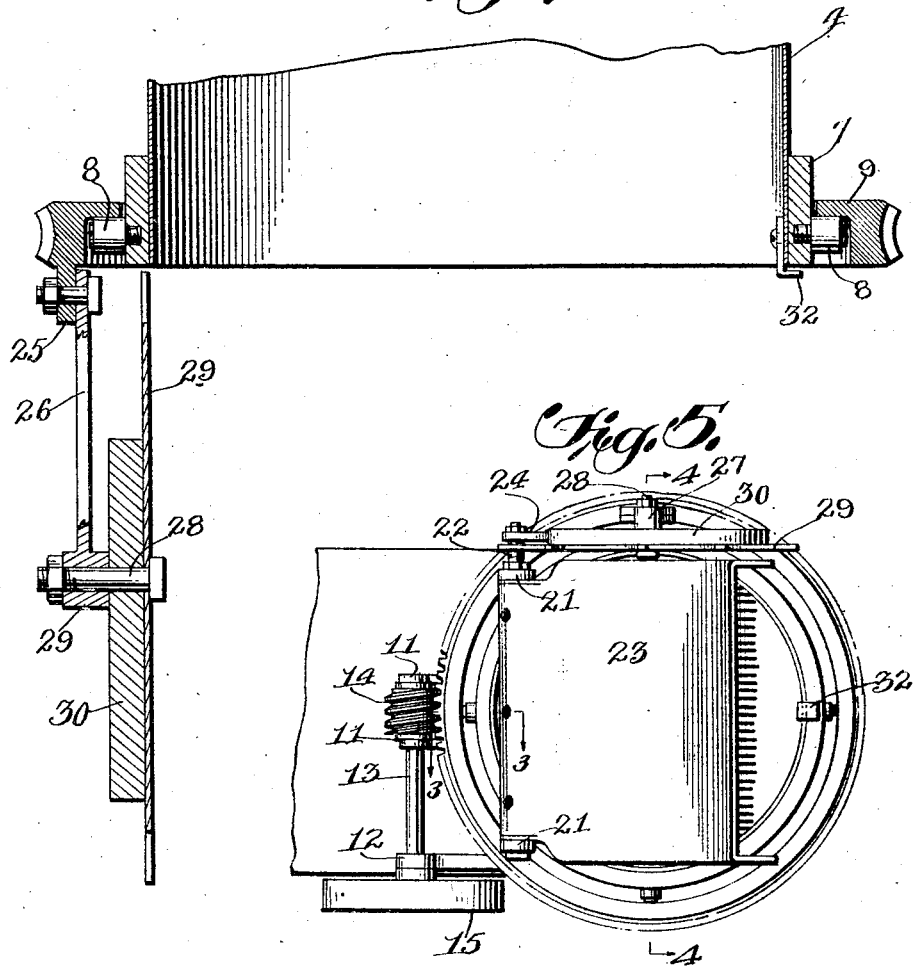
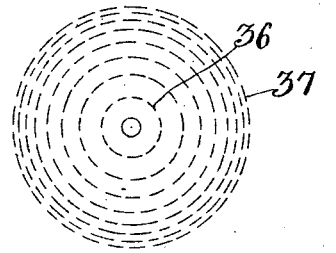
Inventor
Leonard Welker
By *[signature]*
Attorneys Patented Feb. 17, 1931

1,793,032

UNITED STATES PATENT OFFICE

LEONARD WELKER, OF KIEL, WISCONSIN

ENSILAGE DISTRIBUTOR

Application filed November 23, 1929. Serial No. 409,285.

This invention relates to an improved ensilage distributor.

One of the objects of my invention is the provision of a distributing apparatus adapted to be centrally positioned in a silo for receiving and distributing the ensilage as it is deposited in the silo so that the ensilage will be evenly distributed upon the interior of the silo instead of piling up as is usually the case where the ensilage is deposited directly into the silo without using any distributing means.

In filling silos, it has been found that in the distributing of ensilage therein, the heavier portions of the material will have a tendency to pile up in the center with the lighter portions rolling off toward the side of the silo. This uneven distribution causes excessive spoilage from mold and rot and creates a great deal of waste in the material.

Another feature of the above which is another object of my invention is to distribute the ensilage as it is received in the silo so that both the heavy and the light particles are evenly distributed in the body of the silo and in the distribution, the device starts this distribution at the central portion of the silo and works outwardly until it reaches the outer wall of the silo and is then automatically returned to the center of the silo for the next layer of ensilage.

A further object of the invention is the provision of an ensilage distributor for silos which includes a centrally disposed sectional receiving conduit leading into a chamber where the gravitation of the ensilage operates a rotor for imparting movement to a distributing element which distributes the ensilage as it is received thereon from the central portion of the silo to the outer wall thereof.

With the above and other objects in view, the invention consists in the novel features of construction, the combination and arrangement of parts hereinafter more fully set forth, pointed out in the claim and shown in the accompanying drawings wherein:

Figure 1 is an elevation of my improved device, illustrating its application to the interior of a silo;

Figure 2 is an enlarged vertical view through the ensilage receiving chamber with the distributing element in elevation;

Figure 3 is a detail sectional view on the line 3—3 of Figure 5;

Figure 4 is a transverse sectional view on the line 4—4 of Figure 5;

Figure 5 is a bottom plan view; and,

Figure 6 is a diagrammatic view showing the manner in which the ensilage is distributed from the central portion of the silo toward the outer wall thereof.

In the usual construction of silos they include a cylindrical wall 1 usually provided with a vertically disposed opened portion as indicated at 2, and within this opened portion are arranged a plurality of transverse rods 3 forming a suitable ladder-like part whereby a person may reach the top of the silo when the same is filled with ensilage.

My improvement includes a housing 4 having an inlet pipe 5 at one end adapted to receive the lower end of the telescopic sections 6 of the conduit which leads in from the top of the silo. The lower end of this housing 4 tapers to a circular portion and surrounding this circular portion is a bearing ring 7. The bearing ring 7 supports around its periphery a plurality of rollers 8 and rotatably mounted upon these rollers is a worm gear 9 which rides upon the rollers 8.

Supported by the spaced bearings 11 and bearing 12 is a shaft 13 carrying a worm gear 14 which is positioned between the spaced bearings 11 and which meshes with the worm gear 9. Upon the outer end of shaft 13 is a pulley 15 which is connected by means of a belt 16 to a smaller pulley 17 upon the outer end of shaft 18. The shaft 18 extends transversely through the housing 4 and mounted thereon is a rotor 19 having radially disposed blades 20 which are adapted to be disposed in the pathway of ensilage passing down to the entrance pipe 5.

From this, it will be apparent that as the ensilage passes through the housing 4, it will contact with the blades 20 on the rotor 19 and impart a rotative movement thereto. This movement will be imparted to shaft 18 and likewise to shaft 13 rotating the bevel gear 9 through worm gear 14.

Depending from the lower face of the bevel gear 9 are the spaced ears 21 and mounted in these spaced ears is a shaft 22. Attached at its inner end to this shaft 22 is a discharge chute 23 and attached to the shaft 22 on one end is a pawl 24, regulating the movement of the discharge chute 23.

The gear 9 is also provided with a depending ear 25 and bolted to this ear is a supporting arm 26 having a bearing 27 at its lower end which supports a bearing bolt 28. Mounted upon the bearing bolt 28 is a ratchet disc 29 and mounted upon the bolt 28 adjacent the disc 29 is a cam member 30 formed with an outer curved surface which terminates in a raised point 31 forming an offset portion in the cam.

The teeth on the ratchet member 29 during their movement with the gear 9 are adapted to engage a stationary arm 32 which is attached to the lower end of the housing 4, shown in Figure 4, for rotating this ratchet member. In view of the fact that the ratchet member 29 and cam 30 are attached to each other and rotate on the bearing bolt 28, simultaneous movement will be imparted to both of these members when one tooth of the ratchet engages the arm 32.

In order to support the housing 4 within the silo 1, I provide the exterior of the housing with angle brackets 33 and engaged beneath these brackets are the arms 34 which are connected to any of the rods 3 in the vertical opening 2. The inner ends of the arms 34 are supported beneath the brackets 33 by means of a brace member 35, the lower end of which is formed with a plurality of notches 36 adapted to be engaged with any one of the rods 3, as illustrated in Figure 1.

From the foregoing, it will be apparent that the operation of my device is as follows: As the ensilage is deposited in the upper end of the sectional conduit, it drops down through the housing 4 and upon passing through the housing it engages the blades 20 of the rotor 19, imparting a rotative movement to shafts 18 and 13 which in turn will impart a rotative movement to gear 9. As the ensilage passes downwardly through the housing it drops onto the discharge chute 23 and in its relative position as shown in Figure 2, the ensilage will be distributed about the central portion of the silo. Upon the continued passing of the ensilage past the rotor 19, the gear 9 will continue to rotate, carrying with it the chute 23, ratchet 29, and cam 30 and as the teeth of the ratchet pass arm 32, the ratchet will be given a part rotation, imparting a similar movement to cam 30.

It will be noted that as cam 30 is rotated, the pawl 24 will ride upwardly toward the high point of the cam, this movement rotating shaft 22 which in turn will move the chute 23 upwardly so that the ensilage being distributed within the chute will be carried further out toward the outer wall of the silo upon each rotation of the gear 9.

It will be apparent from the foregoing that after the ratchet 29 and the cam 30 have travelled a complete revolution, the pawl 24 will ride off the high point 31 of the cam and drop onto the low point, this movement rotating shaft 22 and returning the chute 23 to its starting position at approximately the central portion of the silo and this operation is continued in order to evenly distribute the ensilage as it passes down through the housing 4. It will thus be apparent that regardless of the different weights of the different particles of the ensilage, it will be evenly distributed from the center to the outer wall of the silo, and due to the automatic operation of the positioning of the discharge chute 23, it will be noted that it will not be necessary to have an attendant to regulate the distribution of the ensilage in the silo, and the silo can be completely filled by re-arranging the housing 4 at different intervals in the filling of the silo.

In Figure 6, it will be noted that the innermost ring, illustrated by dotted lines, and indicated at 36, illustrates the discharge of the ensilage when the shaft 23 is in the position shown in Figure 2, while the outside dotted ring 37 indicates the ensilage distributed toward the outer wall of the silo when the pawl 24 is at the highest point of the cam 30. It is believed that I have provided a comparatively simple and inexpensive device which can be quickly arranged in silos for equally distributing the ensilage as it is deposited therein, without the necessity of having an attendant in the silo, as the device itself operates automatically and thus does away with an extra attendant for this purpose.

While I have shown and described the preferred embodiment of my invention, it will be apparent that slight changes may be made in the construction when putting the invention into practice without departing from the spirit of the same or the scope of the appended claim.

I claim:

An ensilage distributor including a housing through which the ensilage passes, a rotatably mounted gear at the lower end of the housing, a shaft supported transversely of the gear and movable therewith, a discharge chute pivotally mounted upon said shaft, a ratchet rotatably supported beneath the gear, a cam operated simultaneously with the ratchet, a pawl connected to the shaft supporting the discharge chute and riding upon the cam, a stationary arm carried by the housing and adapted to be engaged by the teeth of the ratchet at each rotation of the gear, and means actuated by the ensilage and operatively connected with the gear whereby the movement of the ensilage through the housing will rotate the gear and intermittently move the discharge chute toward the outer wall of the silo and automatically return the same at one stroke toward the central portion of the silo after a predetermined number of revolutions of the gear.

In testimony that I claim the foregoing I have hereunto set my hand at Kiel, in the county of Manitowoc and State of Wisconsin.

LEONARD WELKER.